(12) United States Patent
Kumar et al.

(10) Patent No.: US 12,075,220 B2
(45) Date of Patent: Aug. 27, 2024

(54) SMART ROUTING FOR AUDIO OUTPUT DEVICES

(71) Applicant: Apple Inc., Cupertino, CA (US)

(72) Inventors: Aarti Kumar, Los Altos, CA (US); Bob Bradley, San Jose, CA (US); Natalia A. Fornshell, Campbell, CA (US); Deepak Iyer, Sunnyvale, CA (US); Astrid Yi, Sunnyvale, CA (US); Michael J. Giles, San Jose, CA (US); Sriram Hariharan, San Jose, CA (US); Kang Sun, Sunnyvale, CA (US); Akshay Mangalam Srivatsa, Santa Clara, CA (US); Jonathan A. Bennett, San Francisco, CA (US); Taylor G. Carrigan, San Francisco, CA (US); Anthony J. Guetta, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 17/352,661

(22) Filed: Jun. 21, 2021

(65) Prior Publication Data
US 2021/0400388 A1 Dec. 23, 2021

Related U.S. Application Data

(60) Provisional application No. 63/042,408, filed on Jun. 22, 2020.

(51) Int. Cl.
*G06F 3/16* (2006.01)
*H04R 3/12* (2006.01)

(52) U.S. Cl.
CPC ............... *H04R 3/12* (2013.01); *G06F 3/165* (2013.01); *H04R 2420/07* (2013.01)

(58) Field of Classification Search
CPC ........ H04R 3/12; H04R 2420/07; G06F 3/165
See application file for complete search history.

(56) References Cited

U.S. PATENT DOCUMENTS 11,080,011 B1 * 8/2021 Denis .................... H04W 76/10

FOREIGN PATENT DOCUMENTS

| CN | 105161121 A | 12/2015 |
|---|---|---|
| CN | 110620731 A | 12/2019 |

(Continued)

OTHER PUBLICATIONS

Office Action (with English translation and summary) mailed Jul. 21, 2023 in CN Patent Application No. 202110693803.X. 16 pages.

(Continued)

*Primary Examiner* — Joseph Saunders, Jr.
(74) *Attorney, Agent, or Firm* — Kilpatrick Townsend & Stockton LLP

(57) ABSTRACT

A system and method for routing communication to a common audio output device connected to each of two or more audio signal source devices. For each of the two or more audio signal source devices, a set of inputs are assessed. The set of inputs include: an operational state of the audio signal source device, an activity the audio signal source device, an audio-producing application being executed by the audio signal source device, and a degree of user activity with the audio-producing application being executed by the audio signal source. At a point in time, an audio routing score is generated for each of the two or more audio signal source devices according to a weighted calculation of the set of inputs based on the assessing. Finally, an audio signal routing decision is made, to route an audio signal from one of the two or more audio signal source (Continued)

devices to the audio output device, based on the audio routing score for each of the two or more audio signal source devices.

20 Claims, 10 Drawing Sheets

(56) References Cited

FOREIGN PATENT DOCUMENTS

| | | |
|---|---|---|
| CN | 110945859 A | 3/2020 |
| CN | 111181816 A | 5/2020 |
| WO | 2006134524 A1 | 12/2006 |
| WO | 2017166034 | 10/2017 |
| WO | 2017223165 A1 | 12/2017 |
| WO | 2020082387 | 4/2020 |
| WO | 2020118496 | 6/2020 |

OTHER PUBLICATIONS

Examination Report mailed May 24, 2022 in IN Patent Application No. 202114027972. 6 pages.
Office Action (with English translation and summary) mailed Feb. 3, 2024 in CN Patent Application No. 202110693803.X. 17 pages.

\* cited by examiner

FIG. 2

SMART ROUTING FOR AUDIO OUTPUT DEVICES

CROSS-REFERENCES TO RELATED APPLICATIONS

This application claims the benefit of U.S. Provisional Patent Application No. 63/042,408, entitled "Smart Routing For Audio Output Devices," filed Jun. 22, 2020, hereby incorporated by reference in its entirety and for all purposes.

TECHNICAL FIELD

The subject matter described herein relates to audio output devices, and more particularly to smart routing of multiple sources of wireless audio signals to a commonly-shared audio output device.

BACKGROUND

Many electronic devices today can connect wirelessly with audio output device, which are mainly peripheral devices such as earphones. One type of earphone that is very popular today are known as wireless "earbuds," i.e., small earphones that are fitted directly into a user's ears, and typically into the user's ear canal, such as AirPods® designed and sold by Apple Inc. of Cupertino, CA, which are a very popular wireless peripheral device for receiving and outputting audio signals from one or more audio signal sources over a wireless channel such as Bluetooth.

The audio signal sources can be one or more of a smart phone, such as an iPhone, a smart watch such as an Apple Watch, a tablet computer such as an iPad, and a laptop or desktop computer, such as a MacBook or iMac, respectively, and as an example only. Each audio signal source that uses a wireless channel has an operating system that governs the operations and connectivity of the audio signal source with any of a number of peripheral audio output devices over one or more wireless channels that operate according to a wireless communication protocol. Popular wireless channels and protocols include the wireless technology standard known as "Bluetooth" (BT), which can have a number of variations, such as BT Classic and BT Low Energy (LE). Other wireless technology includes WiFi and cellular communications.

An audio output device such as Apple's AirPods can be simultaneously connected with multiple audio signal sources. For instance, the Bluetooth specification allows for a Bluetooth-enabled device to discover other devices with which to connect, with the discovering device being prioritized over the discovered device. However, as a practical matter, and for the best user experience, an audio output device is configured to only communicate with one of the connected audio signal sources at a time, i.e., to receive audio signals from only that one audio signal source. Yet, if the communication is untimely switched, i.e. without the user's knowledge, consent or understanding, or without the proper replacement audio stream, the user experience of audio output may suffer.

Further complicating such multiple connectivity is that the devices, whether audio output devices or audio signal source devices, might be driven by different operating platforms, i.e. including operating system software and firmware, and those operating systems support many different applications that provide audio signals destined for the audio output device. For example, Mac computers use MacOS and mobile electronic devices such as iPhones and Apple Watches use iOS. These operating systems, and other operating systems, register applications differently. Additionally, requiring a user of an audio output device to make numerous inputs and configuration changes will complicate and lessen the quality of the user experience.

While some audio output devices, such as a set of AirPods, can support two simultaneous connections, and therefore cannot have more than two devices connected at the same time, a challenge is when a third audio signal source enters the communication network. As an example, if one's AirPods are connected to an iPhone, and an iPad is suddenly physically present and tries to connect with the AirPods, logic embedded in the AirPods' operating system will cause the AirPods to disconnect from the iPhone to connect and receive audio signals from the iPad.

Accordingly, given a need for an audio output device to support multiple audio signal source devices, the collection of which may use different operating systems having logic to dictate a prioritization scheme and/or scheduling scheme as to which audio signal source to connect with the audio output device, a challenge exists for implementing a connection prioritization and/or scheduling scheme, without the need to change too much operating system code or firmware. This is particularly so as most of the devices will have already been shipped to the market and in-use, and may not have enough "patch" space in local memory to update either the operating system or the firmware.

Consider a triangle connectivity scenario 100, depicted in FIG. 1A, of a smart phone 102 and a smart watch 104 as audio signal source devices, based on applications they run like audio streaming and voice communication services. Both audio signal sources can be running variations of a common operating system, and can be connected to earbuds 106, which function as an audio output device for the smart phone 102 and the smart watch 104. The operating systems of the devices 102, 104 and 106 coordinate to govern connectivity and communication using a "triangle" table and routing prioritization scheme. In one implementation of this scenario 100, the watch 104 will not establish communication with the earbuds 106 until it is instructed to by the phone 102, which thereafter allows the phone to discontinue communication with the earbuds 106, without any major disconnections.

However, consider a more complex triangle connectivity scenario 120, depicted in FIG. 1B, where the number and types of audio signal source devices 122 that establish a connection with an audio output device 124 can vary greatly. For instance, the audio signal source devices 122 can be a smart watch, a smart phone, a tablet computer, a laptop computer, etc., each having a number of audio-producing applications and possibly different operating systems or operating platforms. In this scenario 120, there is currently no system or process in place to make routing decisions. In another scenario 130, shown in FIG. 1C, an audio output device 132 can move from being in range and connected with a first audio signal source device 134, such as a smart phone within a home office, for example, to being in range and connected with a second audio signal source device 136, such as a tablet computer within a living room, for example.

What is needed is a mechanism and technique for deciding, arbitrating and/or routing audio signal sources from among multiple devices to a common audio output device with no degradation in the user experience or quality of the connections between and among the devices.

SUMMARY

This document describes a system and method to provide a seamless "smart" routing of audio output experience across devices and platforms.

In one aspect, a method, as well as a system that executes the method, is executed by two or more audio signal source devices for routing communication to a common audio output device connected to each of the audio signal source devices. The method include assessing, for each of the two or more audio signal source devices, a set of inputs comprising an operational state of the audio signal source device, an activity the audio signal source device, an audio-producing application being executed by the audio signal source device, and a degree of user activity with the audio-producing application being executed by the audio signal source. The method further includes generating, at a point in time, an audio routing score for each of the two or more audio signal source devices according to a weighted calculation of the set of inputs based on the assessing. The method further includes determining an audio signal routing decision to route an audio signal from one of the two or more audio signal source devices to the audio output device, based on the audio routing score for each of the two or more audio signal source devices Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 is a matrix illustrating auto-routing arbitration that can be employed among multiple audio signal source devices;

When practical, similar reference numbers denote similar structures, features, or elements.

DETAILED DESCRIPTION

Figure 1A:
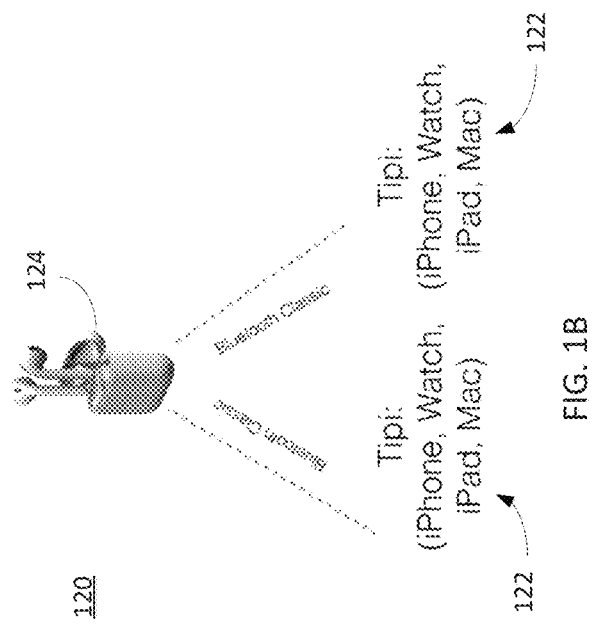
FIGS. 1A-1C illustrate various scenarios of operation between two or more audio signal source devices and a common audio output device.
Figure 1B:
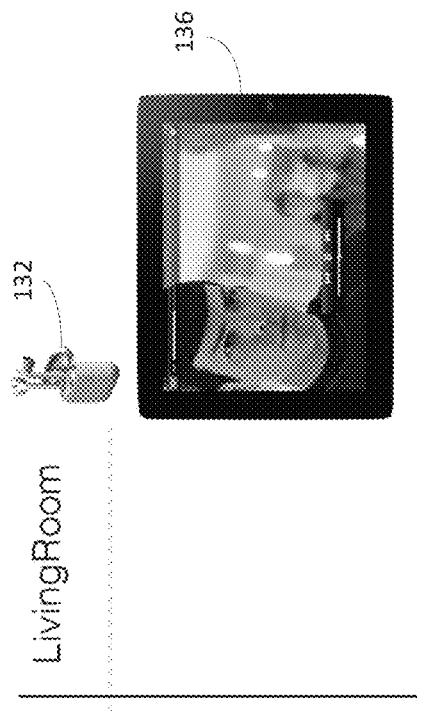
Figure 1C:
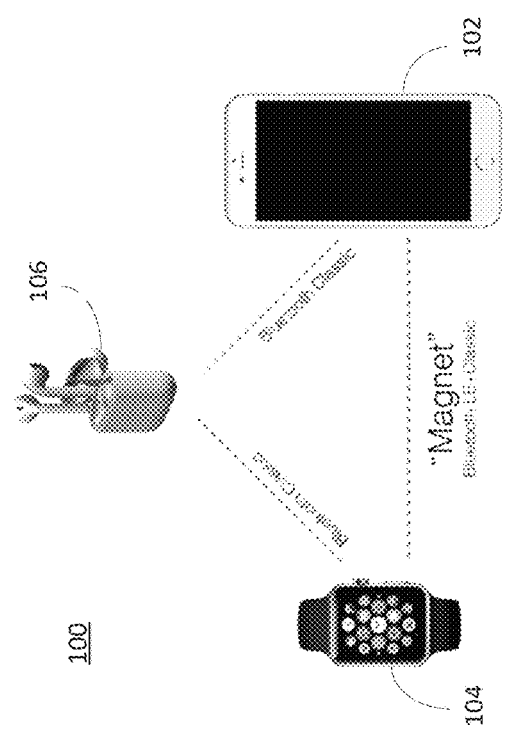

This document discloses a system and method to provide a seamless "smart" routing experience across devices and platforms, by generate an audio routing score. The system and method can be implemented as, or incorporate an algorithm, running constantly while an audio signal source device is on and/or active. The system and method can operate automatically when each device is in use, or can be overridden by manual operation of a device by a user making manual configurations to output an audio signal, such as with an audio output device that is incompatible with an operating system of the audio signal source devices.

In basic terms, the algorithm is executed by two or more audio signal source devices to: 1) determine which audio output device is nearby or within range; 2) determine which other signal source device(s) are nearby or within range and active; 3) generate an audio routing score for each audio signal source device to determine which audio signal source device is selected for communicating an audio signal to the audio output device.

In some implementations, an audio routing score can be qualitative or quantitative. Each of the audio signal source devices and the audio output device has an address and/or device identifier for establishing a wireless connection. The identifier can be used for encrypting communication between devices, and for allowing the communication in the first place. The audio routing score can take into account a present activity of an audio signal source device, which can be measured in such ways as, without limitation, whether an interactive display screen of the audio signal source device is on or off, and/or whether the interactive display screen has been interacted with within a predetermined timeframe, and to what extent the interaction is taking place.

For instance, interaction with an audio generating application can take priority over interaction with an application that does not generate any audio for output. The factors used by the audio routing scoring algorithm can be collected by continual scans of active devices within a predetermined range, which can be a range of a wireless communication technology being used to stream audio, for example. The audio routing score is configured to minimize disruption of an ongoing audio signal for a user, or to enhance the user experience with their audio output device, such as headphones, earbuds or speakers.

The following table represents a particular exemplary implementation, using example variables, ranges, and user activites/interactions with each of a number of audio signal source devices, for routing an audio signal to a commonly connected audio output device, such as a pair of earbuds:

TABLE 1

| Score | Calculation Input |
|---|---|
| UNKNOWN | Operating system/firmware is incompatible/External speaker is connected |
| IDLE | Screen off, but user activity <25 seconds<br>Screen on, but user interacted >8 minutes |
| LOW | Screen off, but 25 seconds since user activity<br>Screen on, but user interacted within 25 seconds - 8 minutes |
| MEDIUM | Audio is playing |
| HIGH | Screen on and user interacted with device <25 seconds |
| CRITICAL | High user activity within first 5 seconds |

In the example, the audio routing score is qualitatively rated from "unknown" to "critical," in an ascending preferential order, i.e. from lowest priority to highest priority. The audio routing score of "unknown" is designated if an audio signal source device has an operating system that is incompatible with either other audio signal source devices, or the audio output device. Alternatively, if an audio output device is already connected to a device using an incompatible operating system, then the audio routing score is low so as to allow that connection to be maintained. The audio routing score of "idle" indicates that, based on a combination of whether a device screen (interactive display) is on or off, and user activity (duration and/or time since last activity). While less than 25 seconds is designated as a time frame since last user interaction when the screen is "off," and more than 8 minutes is designated as a time frame since last user interaction when the screen is "on," other time frames can be used, particularly depending on what is determined to be an optimal user experience with the audio signal source device. The audio routing score is gradually upgraded based on other, narrower ranges of user activity with the audio signal source device, and whether an audio signal is being generated on the audio signal source device, the latter calculation input being provided greater weight in the exemplary implementation.

Accordingly, in some implementations, an audio routing score used for smart routing of audio signals from two or more audio signal source devices to a commonly connected or connectable audio output device can be based on a weighted or unweighted consideration of one or more of the following, which can be tracked by a device's operating system and/or firmware:
  whether an audio signal source device is locked;
  whether a screen of an audio signal source device is on or off;
  whether activity or application usage is presently occurring on an audio signal source device;
  is a user actively and presently using an audio signal source; and
  whether a connectable audio output device is compatible with an operating system of each of the audio signal source devices.

In some implementations, the scoring and smart routing can be disabled under certain circumstances, such as where an older audio output device is used, if any device has been idle in its activity for an extended, predetermined amount of time, or if a device has not been connected to a network or other device for an extended, predetermined amount of time. The decision to disable the scoring and smart routing can be regularly re-evaluated, and restarted under predetermined, user-selectable or factory-established conditions.

In accordance with the disclosure herein, the inputs used to calculate the audio routing score (user activity, duration of activity or time since last activity, audio generating application activity—such as notifications, alerts, music, voicemails, ringtones, alarms, new telephone calls, etc.—or other factors) can each be weighted so as to influence the final audio routing score for a given audio signal source device in a given audio generation event or situation. FIG. 2 is a matrix illustrating auto-routing arbitration that can be employed among multiple audio signal source devices, when one audio signal source device attempts to acquire, "steal" or "hijack" an audio output device for outputting one of a number of playing audio signals.

Once an audio routing score is calculated for each audio signal source device, the score can be advertised to other audio signal source devices within a geographical range, which range can coincide with a range of a wireless communication technology being used to communicate the audio signals, such as Bluetooth for example.

Figure 3A:
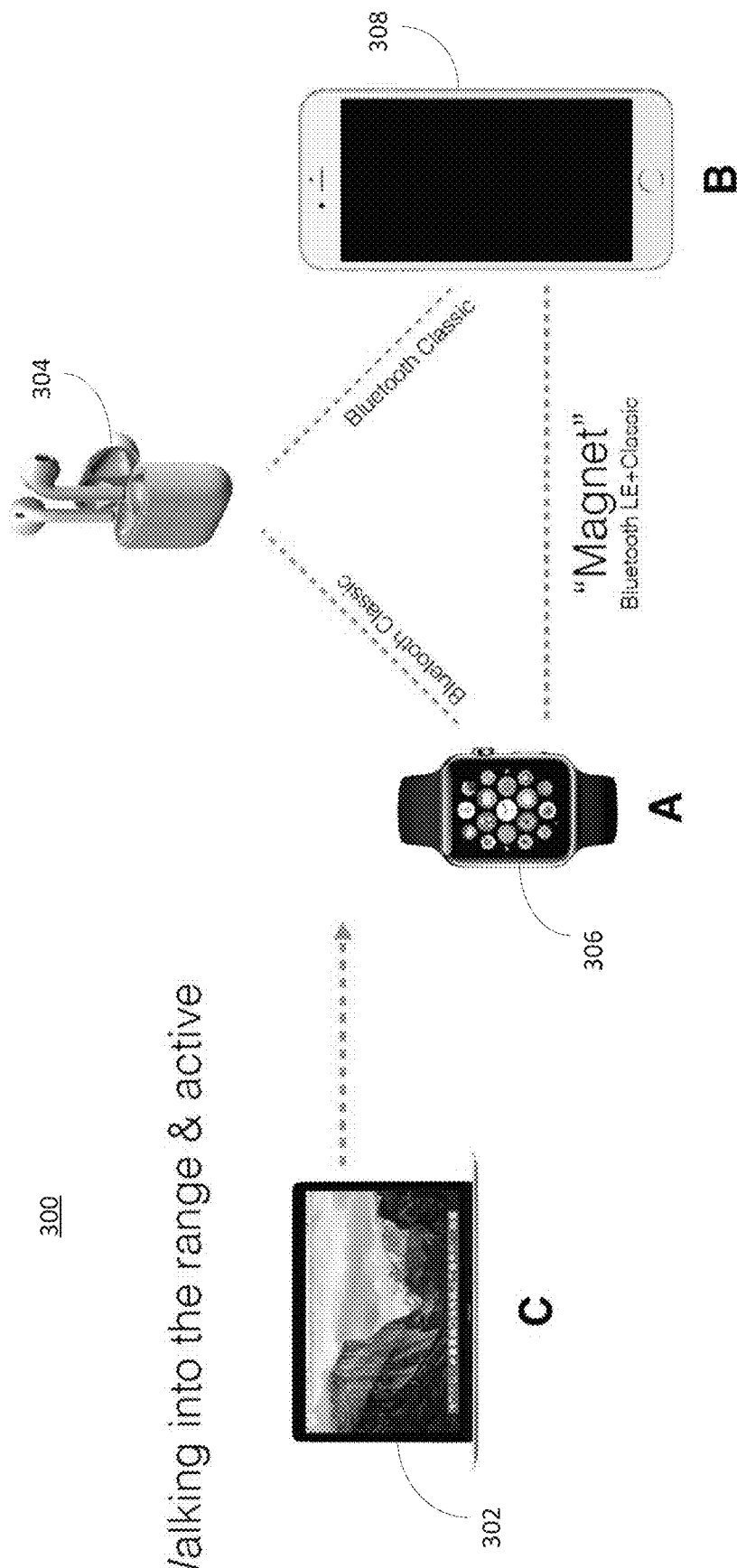
FIGS. 3A-3C illustrate a scenario, an operational sequence, and user interfaces for user interaction, respectively, for opportunistic connection by a second audio signal source device to an audio output device that is already connected in a triangle connectivity scenario with other first audio signal source devices.
Figure 3B:
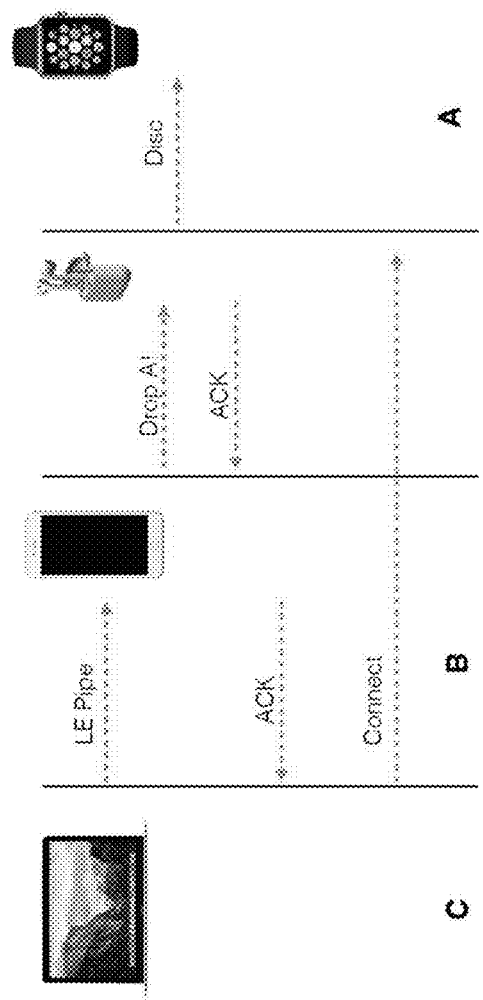
Figure 3C:
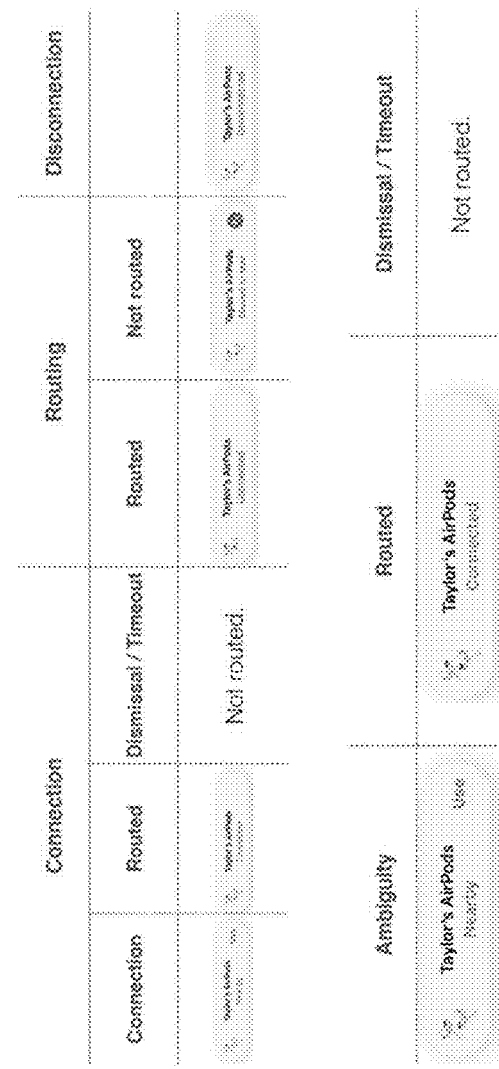

FIGS. 3A, 3B and 3C illustrate a scenario 300, an operational sequence 320, and user interfaces 340 for user interaction, respectively, for opportunistic connection by a second audio signal source device 302 to an audio output device 304 that is already connected in a triangle connectivity scenario 301 with other first audio signal source devices 306 and 308, such as a smart watch and a smart phone, and as shown in FIG. 1A. The audio signal source devices 302, 306 and/or 308 can be continually executing a smart routing algorithm. The second audio signal source device 302 can be moving toward being in range of the audio output device 304, and active in a manner that has a higher audio routing score than either of the first audio signal source devices 306 and 308.

In the scenario 300, one of the first audio signal source devices, such as the smart phone 308, can be designated as master of the set of first audio signal source devices 306 and 308. The master device 308 can detect a presence of the second audio signal source device 302 within range of a wireless signal, update its triangle table, and, if the second audio signal source device 302 has a higher audio routing score than either first audio signal source devices 306 or 308, disconnect the currently-communicating first audio signal source devices 306 or 308 from the audio output device 304, and allow the second audio signal source device 302 to connect and communicate and audio signal with the audio output device 304. Based on a continuous execution of the smart routing algorithm, if the master device 308 detects inactivity and/or disconnection by the second audio signal source device 302 from the audio output device 304, such that its audio routing score drops below the score of either first audio signal source device 306 or 308, then the master device 308 can "hijack" or unilaterally re-establish connection and communication with the audio output device 304.

FIG. 3B illustrates a timing diagram of sequential steps of the smart routing algorithm as executed by the devices 302, 304, 306 and 308, each of which are able to acknowledge ("ACK") connectivity and communication or disconnection and suspension of communication with the audio output device 304.

While the smart routing algorithm can be continuously and automatically executed by the devices 302, 304, 306 and 308, a set of graphical prompts can be generated and displayed on an interactive display of any of the devices, as shown in FIG. 3C, so as to inform a user of a pending connectivity and communication decision, and/or to receive user acknowledgement or instruction as to whether such decision should be enacted or made. In some instances, the graphical prompts can allow a user to reverse a decision of the smart routing algorithm, before the decision is enacted or after the decision has been enacted to revert to a previous communication state. These graphical prompts can be generated by the graphical user interface in the display, based on notifications generated by the smart routing system and algorithm. As shown in FIG. 2, whether a graphical prompt is generated and displayed can be based on an audio routing score, or on a mapping of an audio routing score from one device to another.

In some implementations, the audio generated by audio signal source devices can be characterized and prioritized, as shown in FIG. 2. The prioritization scheme, for example prioritizing a phone call ring tone over a music streaming application, can be adjusted manually or automatically. For instance, a user can be prompted to enter a priority scheme of various possible audio inputs for their audio output device. In other cases, an algorithm can be used to "learn" from historical user behavior as to what the user prioritizes and when, and using a certain audio signal source device. For instance, the user may grant a higher priority to a music streaming application on their laptop computer than a music streaming application on their smart phone.

Figure 4A:
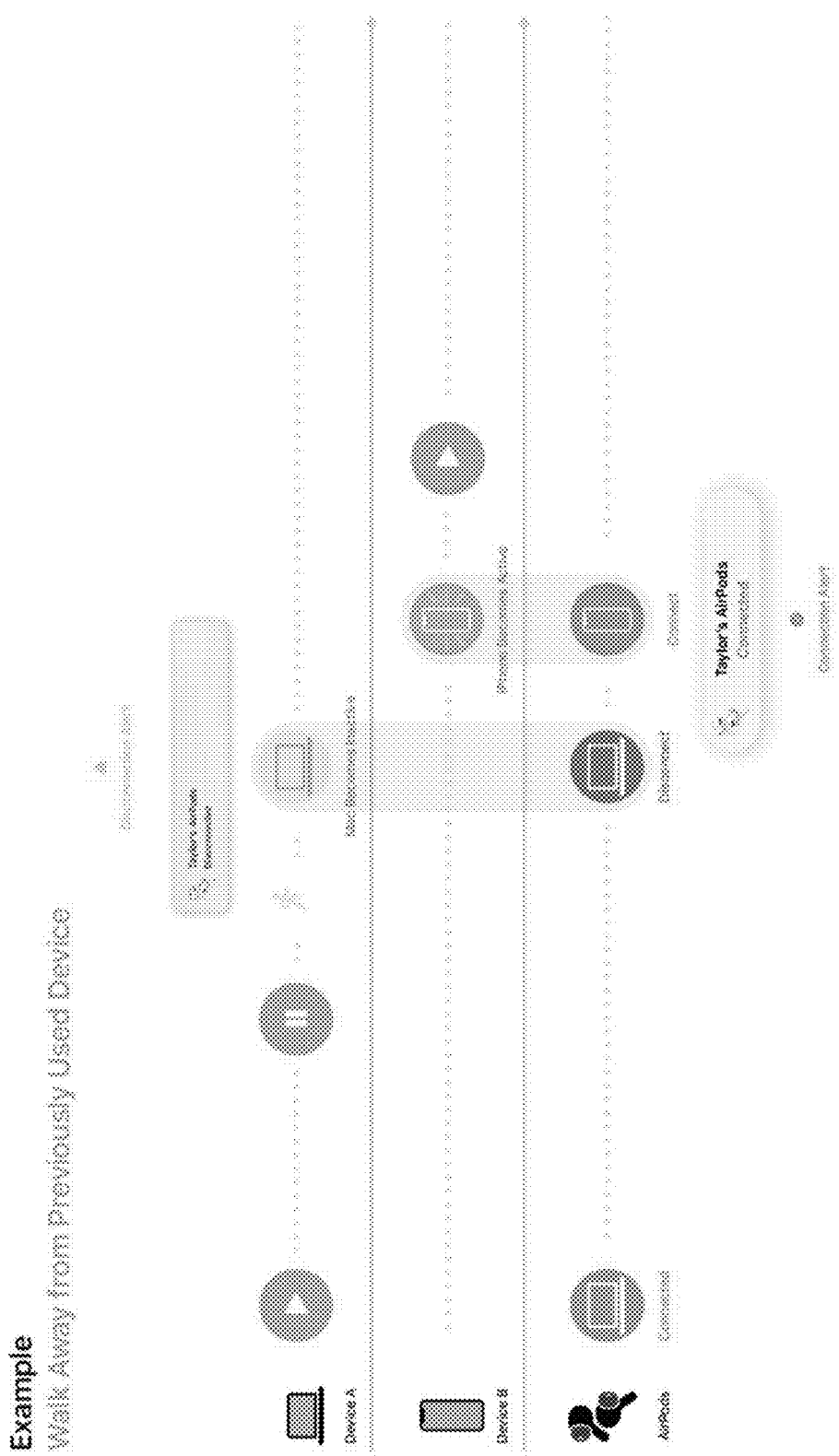
FIGS. 4A-4F illustrate various use cases of a smart routing method according to and consistent with implementations described herein.
Figure 4B:
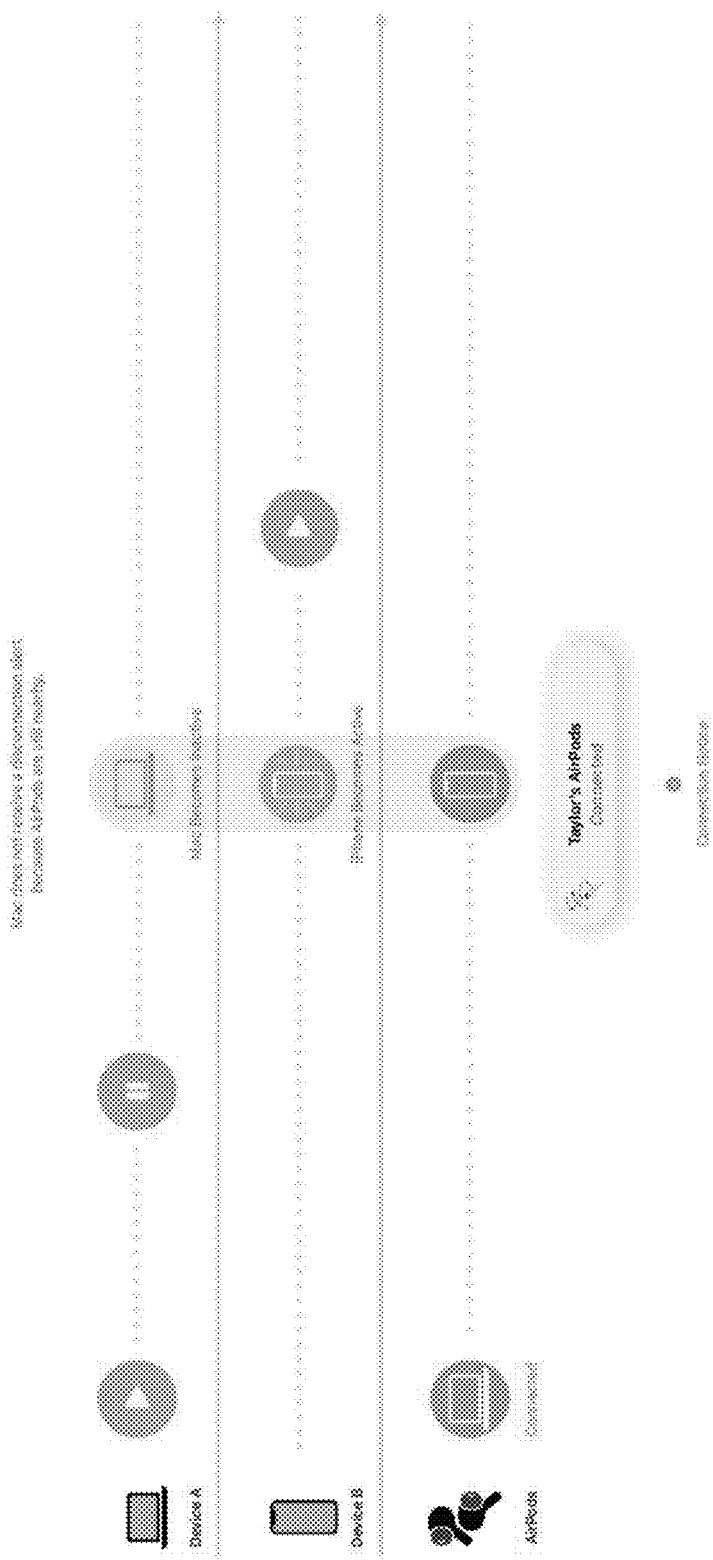
Figure 4C:
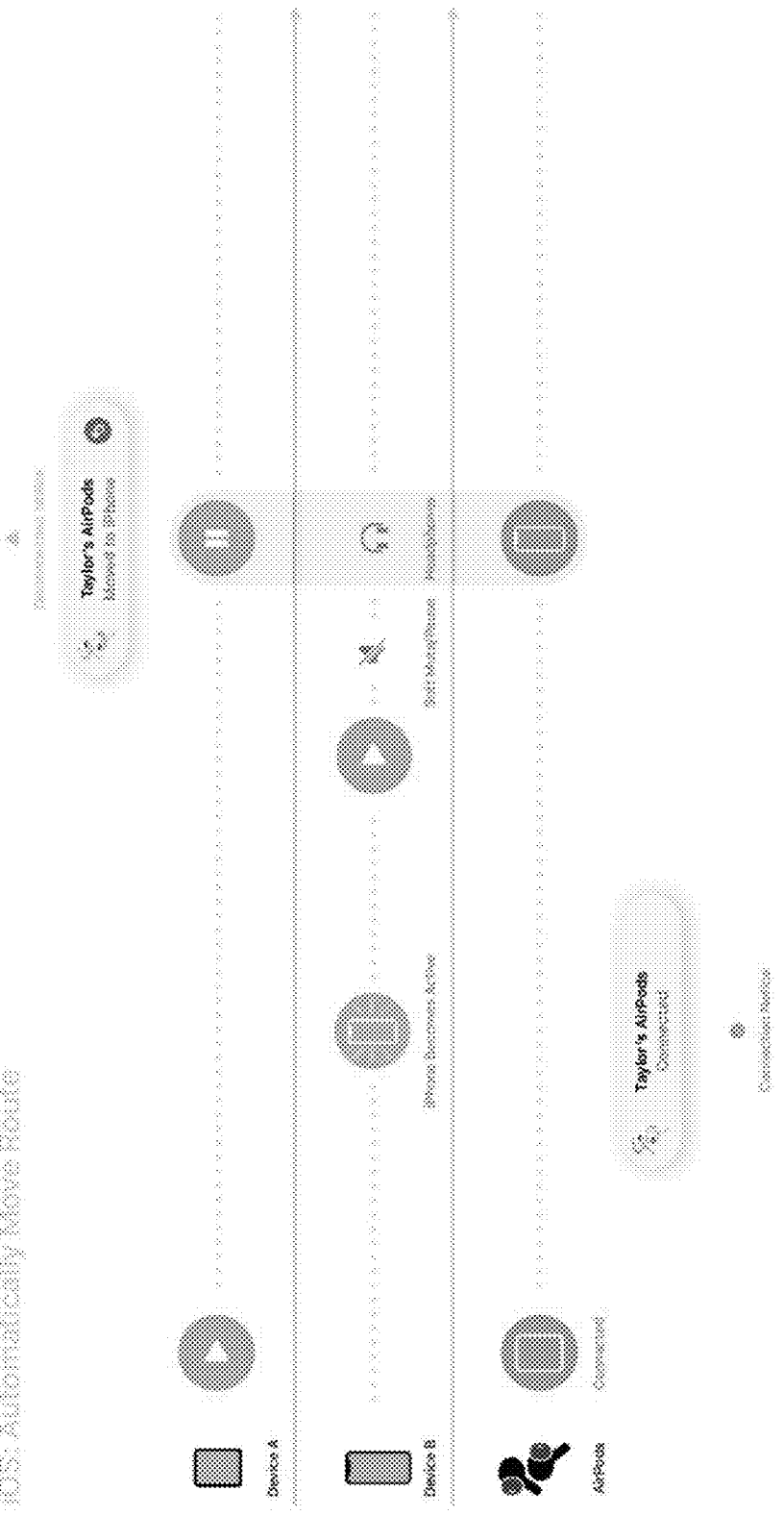

FIGS. 4A-4F illustrate various use cases of a smart routing method according to implementations described herein, where an audio output device is a set of earbuds, such as AirPods. FIG. 4A illustrates an example where a user walks away from a previously-used first audio signal source device, such as a laptop computer, and to being in range to a second audio signal source device. FIG. 4B illustrates an example where a user switches from one audio signal source device to another, and provides notice of the switching when prompted. FIG. 4C illustrates an example of a switch from a first audio signal source device to a second audio signal source device, while playing music on the first audio signal source device, and using an automatic move routing function.

Figure 4D:
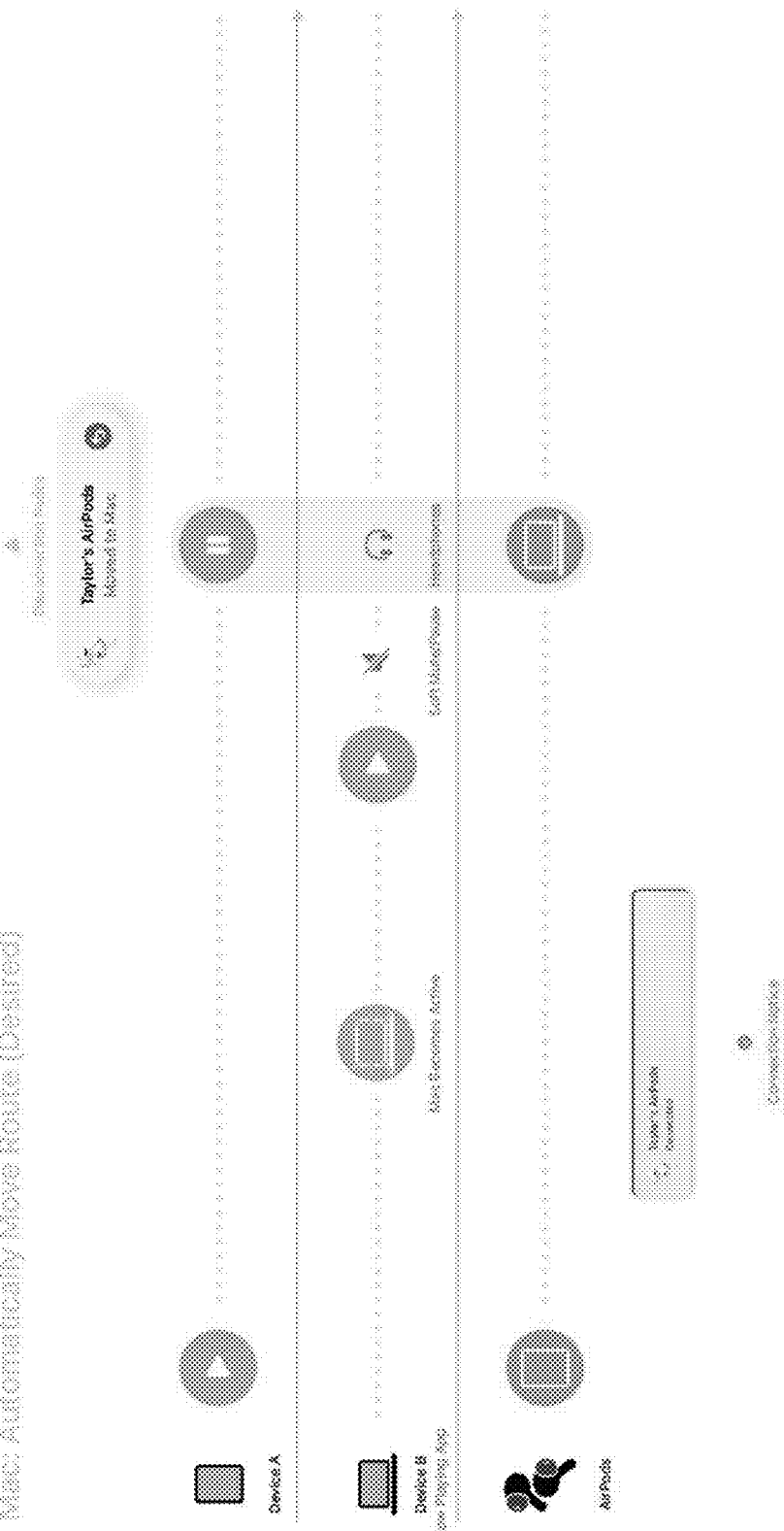
Figure 4E:
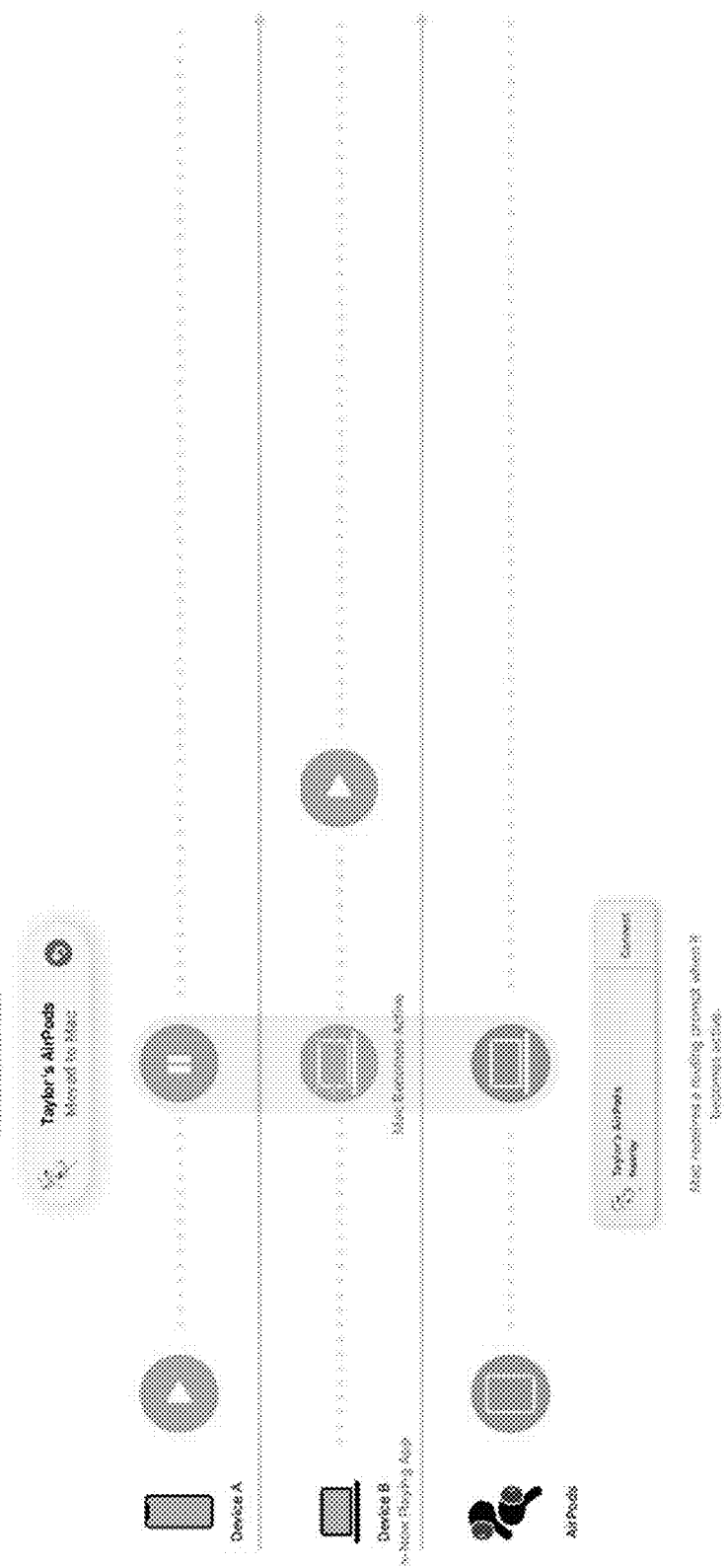
Figure 4F:
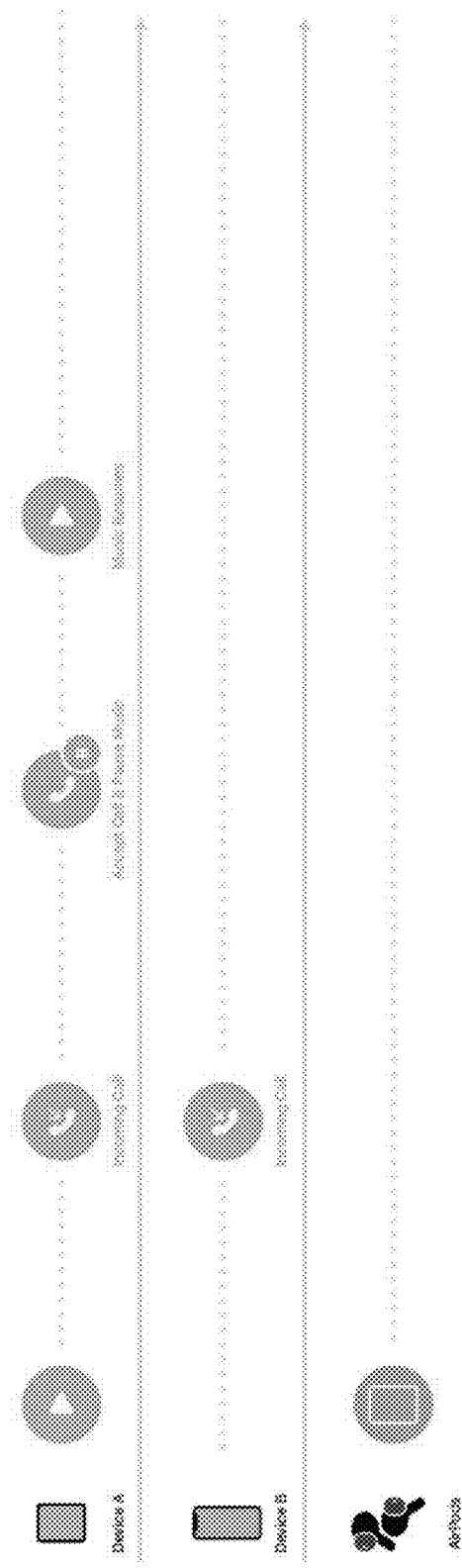

FIG. 4D illustrates an example of a switch from a first audio signal source device to a second audio signal source device, while playing music on the first audio signal source device, and using a desired routing. FIG. 4E illustrates an example of a switch from a first audio signal source device to a second audio signal source device, while playing music on the first audio signal source device, and using a move routing function based on a user input to acknowledge a graphical prompt. FIG. 4F illustrates an example where a user accepts a call on an audio signal source device while listening to music on the same device, and despite getting a call on a second device.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method executed by two or more audio signal source devices for routing communication to a common audio output device connected to each of the audio signal source devices, the method comprising:
   assessing, for each particular audio signal source device of the two or more audio signal source devices, a set of inputs comprising an operational state of the particular audio signal source device, a user activity with the particular audio signal source device within a time duration threshold, an audio-producing application being executed by the particular audio signal source device, and a degree of user activity with the audio-producing application;
   generating, at a point in time, an audio routing score for each of the two or more audio signal source devices according to a weighted calculation of the set of inputs based on the assessing; and
   determining an audio signal routing decision to route an audio signal from one of the two or more audio signal source devices to the audio output device, based on the audio routing score for each of the two or more audio signal source devices.

2. The method in accordance with claim 1, wherein the audio-producing application is one of an alert or sound effect, an audio streaming application, a ringtone or alarm, or a call notification.

3. The method in accordance with claim 1, wherein the degree of user activity with the audio-producing application being executed by the particular audio signal source device includes a second time duration threshold.

4. The method in accordance with claim 1, further comprising routing the audio signal from a selected audio signal source device of the two or more audio signal source devices.

5. The method in accordance with claim 4, wherein routing the audio signal further comprises:
   disconnecting a first of the two or more audio signal source devices from the audio output device; and
   connecting the selected audio signal source device of the two or more audio signal source devices to the audio output device.

6. The method in accordance with claim 1, wherein the operational state of the audio signal source device includes a display-off operational state and a display-on operational state.

7. The method in accordance with claim 1, wherein the operational state of the audio signal source device includes a standby operational state and an active operational state.

8. A system for routing communication to a common audio output device connected to each of two or more audio signal source devices, the system comprising:
   computer hardware configured to perform operations comprising:
   assess, for each particular audio signal source device of the two or more audio signal source devices, a set of inputs comprising an operational state of the particular audio signal source device, a user activity with the particular audio signal source device within a time duration threshold, an audio-producing application being executed by the particular audio signal source device, and a degree of user activity with the audio-producing application;
   generate, at a point in time, an audio routing score for each of the two or more audio signal source devices according to a weighted calculation of the set of inputs based on the assessing; and
   determine an audio signal routing decision to route an audio signal from one of the two or more audio signal source devices to the audio output device, based on the audio routing score for each of the two or more audio signal source devices.

9. The system in accordance with claim 8, wherein the assessing, generating, and determining are performed by an operating system or firmware of at least one of the two or more audio signal source devices.

10. The system in accordance with claim 8, wherein the audio-producing application is one of an alert or sound effect, an audio streaming application, a ringtone or alarm, or a call notification.

11. The system in accordance with claim 8, wherein the degree of user activity with the audio-producing application being executed by the particular audio signal source device includes a second time duration threshold.

12. The system in accordance with claim 8, wherein the operations further comprise routing the audio signal from a selected audio signal source device of the two or more audio signal source devices.

13. The system in accordance with claim 12, wherein routing the audio signal further comprises:
   disconnecting a first of the two or more audio signal source devices from the audio output device; and
   connecting the selected audio signal source device of the two or more audio signal source devices to the audio output device.

14. The system in accordance with claim 8, wherein the computer hardware comprises
   at least one programmable processor; and
   a non-transitory machine-readable medium storing instructions that, when executed by the processor, cause the at least one programmable processor to perform at least some of the operations.

15. A computer program product for routing communication to a common audio output device connected to each of two or more audio signal source devices, the computer program product comprising:
   at least one programmable processor; and
   a non-transitory machine-readable medium storing instructions that, when executed by the processor, cause the at least one programmable processor to perform operations comprising:
   assessing, for each particular audio signal source device of two or more audio signal source devices, a set of inputs comprising an operational state of the particular audio signal source device, a user activity with the audio signal source device within a time duration threshold, an audio-producing application being executed by the particular audio signal source device, and a degree of user activity with the audio-producing application;

generating, at a point in time, an audio routing score for each of the two or more audio signal source devices according to a weighted calculation of the set of inputs based on the assessing; and determining an audio signal routing decision to route an audio signal from one of the two or more audio signal source devices to the audio output device, based on the audio routing score for each of the two or more audio signal source devices.

16. The computer program product in accordance with claim 15, wherein instructions stored by the non-transitory machine-readable medium for performing the assessing, generating, and determining is an operating system of at least one of the two or more audio signal source devices.

17. The computer program product in accordance with claim 15, wherein the audio-producing application is one of an alert or sound effect, an audio streaming application, a ringtone or alarm, or a call notification.

18. The computer program product in accordance with claim 15, wherein the degree of user activity with the audio-producing application being executed by the particular audio signal source device includes a second time duration threshold.

19. The computer program product in accordance with claim 15, further comprising routing the audio signal from a selected audio signal source device of the two or more audio signal source devices.

20. The computer program product in accordance with claim 19, wherein routing the audio signal further comprises:

disconnecting a first of the two or more audio signal source devices from the audio output device; and connecting the selected audio signal source device of the two or more audio signal source devices to the audio output device.

* * * * *